United States Patent [19]

Umezawa

[11] Patent Number: 5,582,274
[45] Date of Patent: Dec. 10, 1996

[54] BRAKE BAND

[75] Inventor: Shigeki Umezawa, Shizuoka-ken, Japan

[73] Assignee: NSK-Warner K.K., Tokyo, Japan

[21] Appl. No.: 416,209

[22] Filed: Apr. 4, 1995

[30] Foreign Application Priority Data

Apr. 4, 1994 [JP] Japan .................................. 6-087203

[51] Int. Cl.⁶ ........................... F16D 51/04; F16D 65/78
[52] U.S. Cl. .................................. 188/77 W; 188/259
[58] Field of Search ........................... 188/77 R, 77 W, 188/82.6, 250 A, 259; 192/80, 81 R, 107 T

[56] References Cited

U.S. PATENT DOCUMENTS

| | | | |
|---|---|---|---|
| 3,670,392 | 6/1972 | Haas | 188/259 |
| 4,023,656 | 5/1977 | Kuwahara et al. | 188/77 R |
| 4,201,281 | 5/1980 | MacDonald | 192/80 |
| 4,795,013 | 1/1989 | Latsko | 192/79 |
| 5,135,082 | 8/1992 | Umezawa et al. | 188/77 R |
| 5,238,091 | 8/1993 | Nakagawa et al. | 188/77 W |

FOREIGN PATENT DOCUMENTS 2-33939   3/1990   Japan .

*Primary Examiner*—Robert J. Oberleitner
*Assistant Examiner*—Chris Schwartz
*Attorney, Agent, or Firm*—Evenson, McKeown, Edwards & Lenahan, P.L.L.C.

[57] ABSTRACT

A brake band for being pulled tight against a drum as a braked member is disclosed. The brake band is composed of a lining and a strap arranged on an outer side of the lining. The strap has an extension extending out from one side edge thereof in the direction of an axis of the drum beyond a corresponding side edge of the lining to form an oil-holding portion between the extension and the drum. The lining defines oil grooves which are open into the oil-holding portion.

5 Claims, 5 Drawing Sheets

BRAKE BAND

BACKGROUND OF THE INVENTION a) Field of the Invention

This invention relates to an improvement in a brake band employed in a power transmission for an automotive vehicle or the like.

b) Description of the Related Art

In a power transmission for an automotive vehicle or the like, it is generally practiced as a common technique to pull a brake band tight against a clutch drum to apply braking force to the clutch drum. Lubrication of a lining of the brake band is effected by oil guided out through oil apertures formed in the clutch drum or by oil caused to spout out to and around the lining.

In view of the public concern about energy and environment, a brake is now required to be small and light, to produce a smaller shock when actuated, and to have a high torque capacity. Keeping step with the recent trend toward automotive engines of higher rpm and higher power output, the brake must also successfully meet the current tendency toward severer use conditions where the brake must withstand high energy. The demand for a brake band is therefore becoming increasingly severer.

As far as oil is concerned, it is desired to achieve sufficient lubrication and seizure prevention by a small amount of oil leaked out while having lubricating other parts. Where no apertures are formed, for example, in a clutch drum as a braked member, only a small fraction of oil, which has been caused to spout out under centrifugal force subsequent to lubrication of a clutch mechanism accommodated within the clutch drum, is used as a lubricant for the brake band. To meet the above-described trend toward automotive engines of higher rpm and higher power output, oil supplied in a small amount from opposite side edges of the lining is too little to achieve sufficient lubrication, leading to the problem that the lining may burn up.

FIG. 6 is a transverse cross-sectional view of an illustrative conventional brake band combined with a clutch drum, whereas FIG. 7 is a plan view of the brake band, namely, a combined unit of a lining and strap as viewed in a direction from an inner side of the lining. Designated generally at numeral 10 in FIG. 6 is a clutch mechanism. Incidentally, this clutch mechanism is of the common art and its detailed description is therefore omitted herein.

A clutch drum 11 as a braked member is provided on an outer peripheral wall thereof with a brake band 50. The brake band 50 is composed of a lining 20 and a strap 30 arranged on an outer side of the lining 20. The lining 20 is arranged for contact with the outer peripheral wall of the clutch drum 11 and, in the example illustrated in the drawings, centrally defines grooves 22. The strap 30 is employed to pull the lining 20 tight against the outer peripheral wall of the clutch drum 11.

Where the clutch drum 11 is not provided with any oil apertures, oil which has lubricated the clutch mechanism 10 is caused to spout out under centrifugal force through a fitted area 12 between the clutch drum 11 and an associated component as indicated by arrow R. It is however only a small fraction of the oil that is used for the lubrication of the brake band 50.

As is depicted in FIG. 7, when the combined unit of the lining 20 and the strap 30 is observed from the inner side of the lining 20, oil apertures 34 formed through the strap 30 are located opposite respective oil grooves 21 formed through the lining 20. A portion of oil, which has been caused to spout out under centrifugal force through the fitted area 12 as described above, enters the oil grooves 21 through the oil apertures 34 in the strap 30 so that the lining 20 is lubricated. The amount of the oil actually used for the lubrication is however still small. The oil, which is supplied in the small amount through the oil apertures 34 in the strap 30 and from the opposite side edges of the lining 20, cannot provide sufficient lubrication, thereby unavoidably resulting in the inconvenience that the lining may be burnt up.

Incidentally, a hole 35 shown in FIG. 7 is a rivet hole through which a rivet is allowed to extends to unite the lining 20 and the strap 30 together.

SUMMARY OF THE INVENTION

An object of the present invention is to assure sufficient lubrication of a brake band by using a small amount of oil leaked out from a rotating member such as a clutch drum so that the current trend toward automotive engines of higher power output and higher rpm can be met.

In one aspect of the present invention, there is thus provided a brake band for being pulled tight against a drum as a braked member. The brake band is composed of a lining and a strap arranged on an outer side of the lining. The strap has an extension extending out from one side edge thereof in the direction of an axis of the drum beyond a corresponding side edge of the lining to form an oil-holding portion between the extension and the drum. The lining defines oil grooves which are open into the oil-holding portion.

Preferably, the strap has been worked around at least a free side edge portion of the extension to form an additional oil-holding portion on and along a back side of said strap and the strap defines at least one bore therethrough to permit feeding of oil from said additional oil-holding portion to a side of said lining. As an alternative, an additional member may be attached to at least a free side edge portion of said extension instead of working around at least the free side edge portion of the extension of the strap.

Owing to the above construction, the brake band according to the present invention can effectively use oil which is caused to spout out under centrifugal force through a fitted area between the drum and its associated component. In the case of the preferred embodiments, it is also possible to make use of oil which drips onto a back, in other words, outer side of the strap from a casing in which the drum is accommodated. The brake band can hence be fully lubricated to make it suited for use with an automotive engine or the like whose power output and rpm tend to become higher.

DETAILED DESCRIPTION OF THE INVENTION AND PREFERRED EMBODIMENTS

Figure 1:
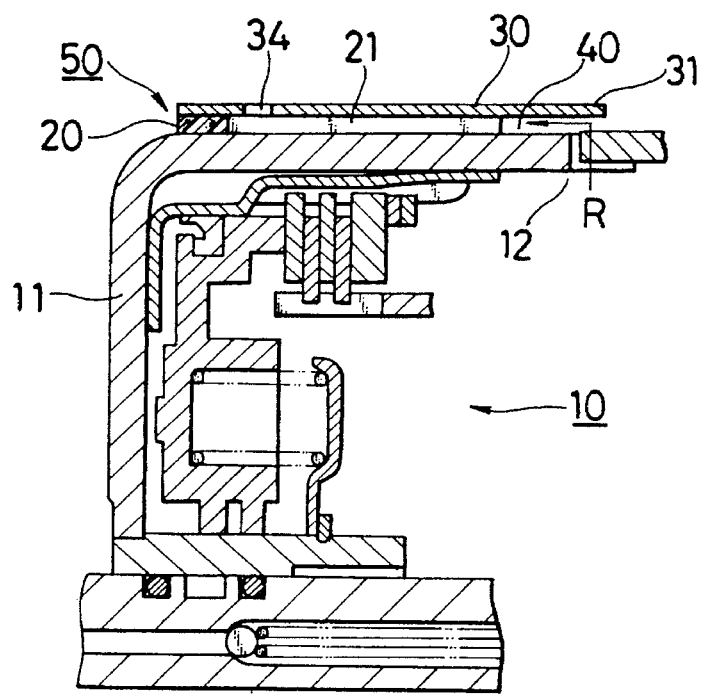
FIG. 1 is a transverse cross-sectional view of a brake band according to a first embodiment of the present invention, as applied to a clutch drum.
Figure 5A:
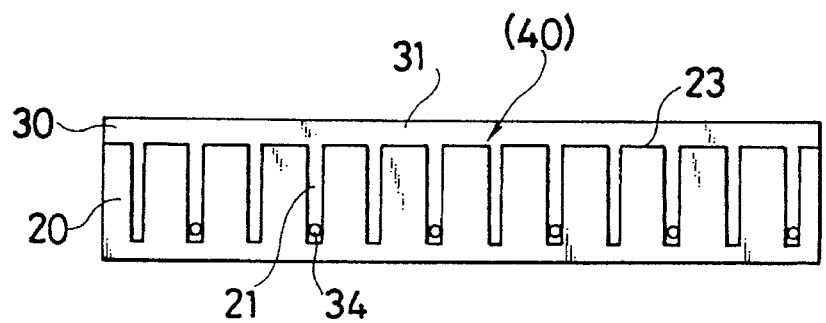
FIGS. 5A through 5H are plan views of various combined lining-strap units as viewed from inner sides of the linings, and show various shapes and combinations of oil grooves and oil apertures.

Referring first to FIGS. 1 and 5A, the brake band according to the first embodiment of the present invention will be described. A brake band 50 composed of a lining 20 and a strap 30 is arranged on the drum of the clutch mechanism 10. The strap 30 is extended at one side edge thereof in an axial direction of the drum beyond a corresponding side edge of the lining 20, whereby an extension 31 is formed. This extension 31 serves as an oil catcher so that an oil-holding portion 40 is formed between the extension 31 and the clutch drum 11.

From the clutch mechanism 10, oil is caused to spout out under centrifugal force through the fitted area 12 between the clutch drum 11 and the associated component as indicated by arrow R. The extension 31 of the strap 31 acts as a catcher and catches the oil, whereby the oil-holding portion 40 is formed between the extension 31 and the clutch drum 11.

As shown in FIG. 5A in which the combined unit of the lining 20 and the strap 30 is viewed from the inner side of the lining 20, many oil grooves 21 are formed in the inner side (i.e., the side at which the lining 20 is brought into contact with the outer peripheral wall of the clutch drum 11) of the lining 20. In the drawing, numeral 31 indicates the extension of the strap 30 and, as will become apparent from a reference to FIG. 1, the oil-holding portion 40 is formed between the extension 31 and the corresponding side edge of the lining 20 (and the outer peripheral wall of the clutch drum 11). The oil grooves 21 are formed so that they are all open into the oil-holding portion 40. The oil in the oil-holding portion 40 is supplied to the lining 20 through the oil grooves 21.

The brake band according to the second embodiment of the present invention will now be described with reference to FIG. 2. In the second embodiment, a resin mold 32 is attached to a free edge portion of the extension (catcher) 31 of the strap 30 so that an outer, namely, back side of the strap 30 is formed as an additional oil-holding portion 40'. Since the oil apertures 34 are formed in the strap 30 so that the oil apertures 34 are open into the oil grooves 21 of the lining 20 as shown in FIG. 5A, the oil which has dipped down from the associated casing is held in the oil-holding portion 40' on the back side of the strap 30 is supplied to the lining 20 by entering the oil grooves 21 in the lining 20 through the oil apertures 34.

Figure 2:
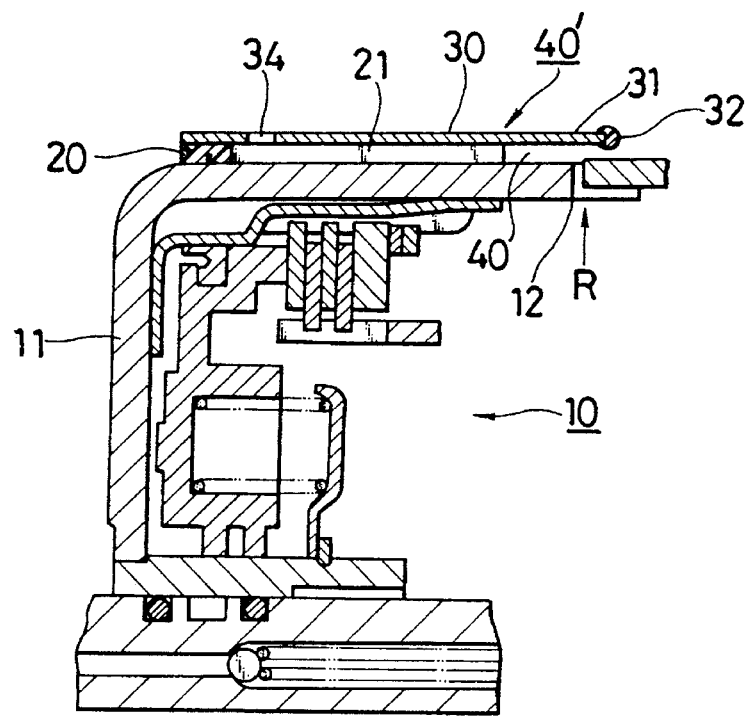
FIG. 2 is a transverse cross-sectional view of a brake band according to a second embodiment of the present invention, as applied to a clutch drum.

In the second embodiment shown in FIG. 2, oil is therefore sufficiently supplied from the oil-holding portion 40 to the side edges of the lining 20 and also from the oil-holding portion 40', in other words, from the upper side of the lining 20.

Figure 3:
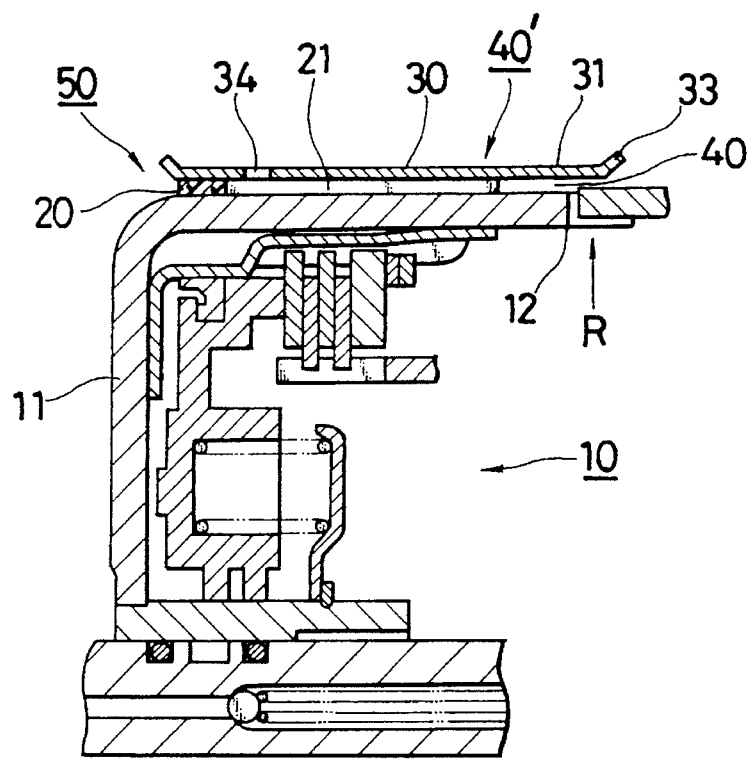
FIG. 3 is a transverse cross-sectional view of a brake band according to a third embodiment of the present invention, as applied to a clutch drum.

In the third embodiment depicted in FIG. 3, opposite sides edges of a strap 30 are both worked into bend portions 33 so that an additional oil-holding portion 40' is formed on and along a back side of the strap 30.

Figure 4:
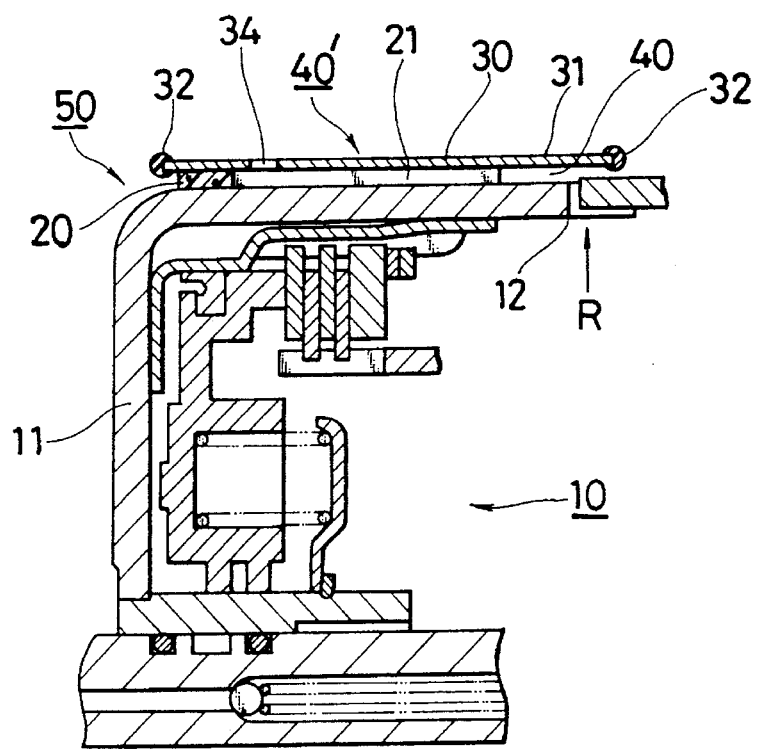
FIG. 4 is a transverse cross-sectional view of a brake band according to a fourth embodiment of the present invention, as applied to a clutch drum.

Referring next to FIG. 4, the brake band according to the fourth embodiment of the present invention will be described. Resin molds 32 are attached to opposite side edges of a strap 30, respectively, so that an additional oil-holding portion 40' is formed on and along a back side of the strap 30.

Figure 5B:
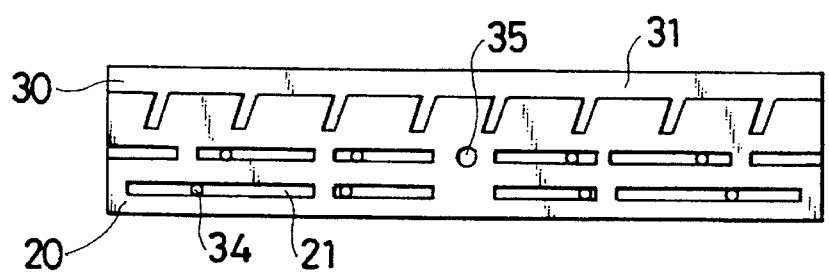
Figure 5C:
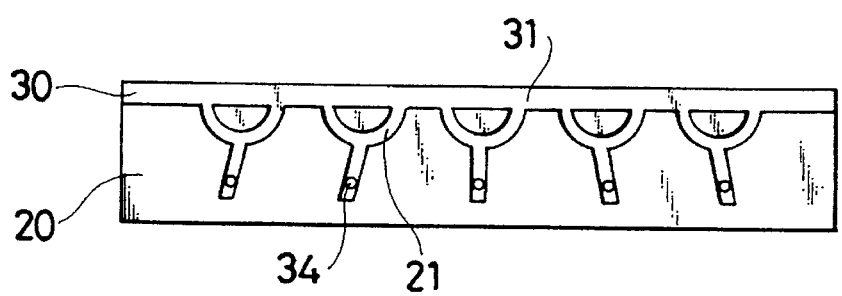
Figure 5D:
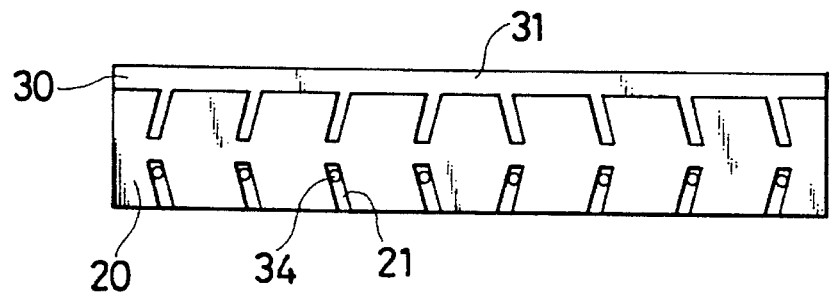
Figure 5E:
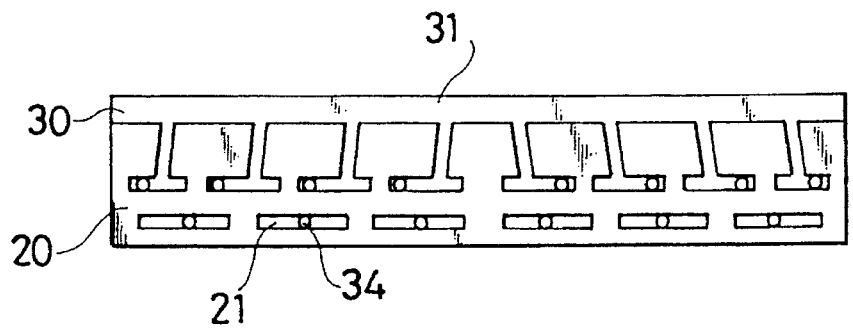
Figure 5F:
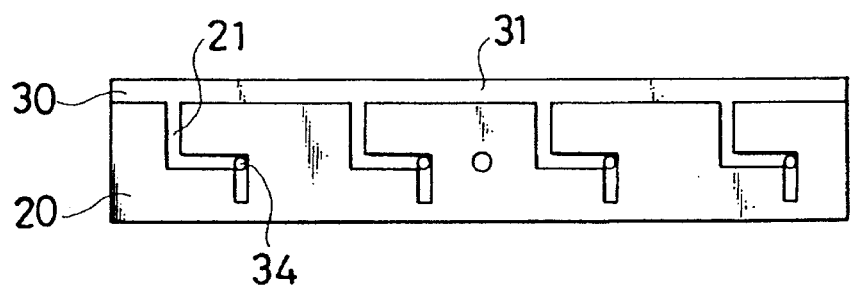
Figure 5G:
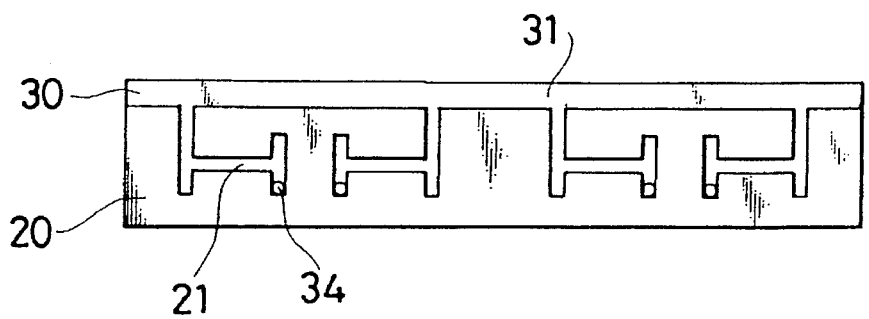
Figure 5H:
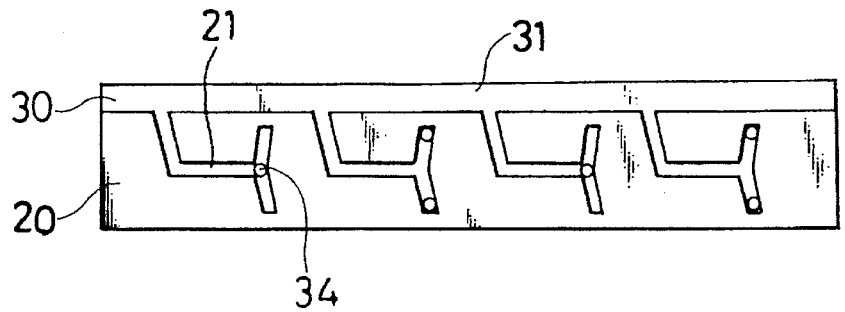
Figure 6:
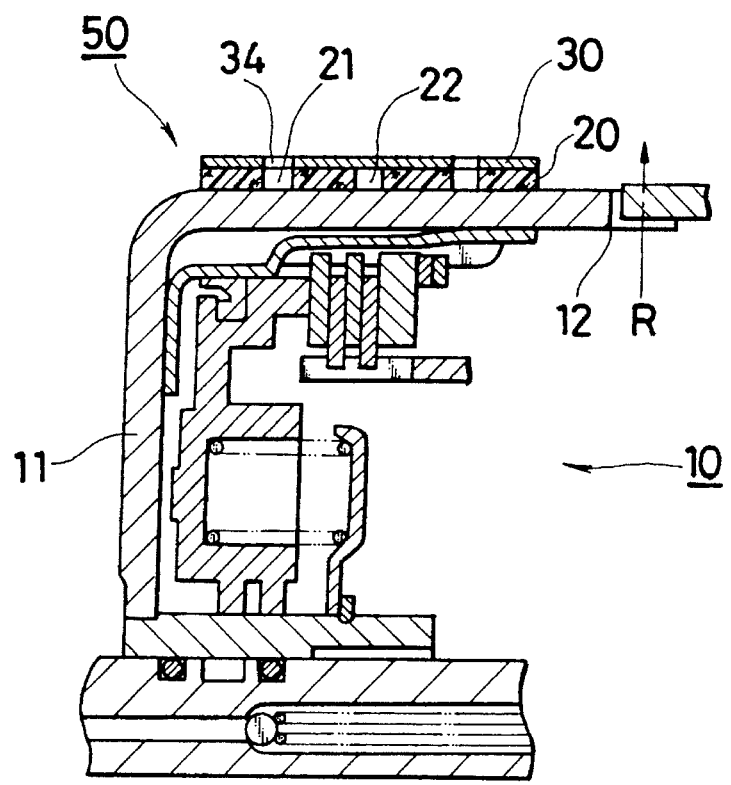
FIG. 6 is a transverse cross-sectional view of an illustrative conventional brake band combined, as applied to a clutch drum.
Figure 7:
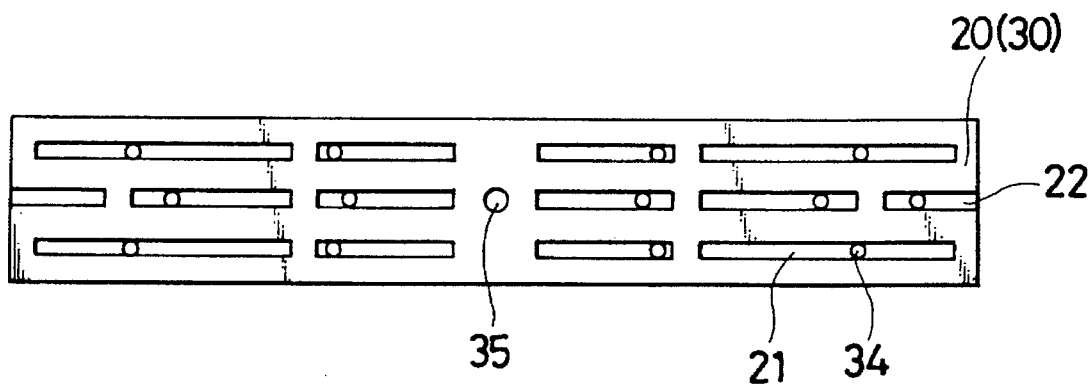
FIG. 7 is a plan view of the conventional brake band of FIG. 6 and shows one example of arrangement of oil grooves and oil apertures.

The seven drawings of FIGS. 5B through 5H are similar to FIG. 5A and FIG. 7. Combined unites of linings 20 and straps 30 are each observed from the side of its inner side (i.e., the side at which the lining 20 is brought into contact with the associated clutch drum). Various illustrative combinations of the oil grooves 21 in the lining 20 and oil apertures 34 in the strap 30 are shown. Of these, the brake bands shown in FIGS. 5B and 5E are particularly suited for use as the brake bands according to the second to fourth embodiments illustrated in FIGS. 2 through 4, respectively, in other words, in combination with the additional oil-holding portion 40' because in the case of FIG.5B, none of the oil grooves 21 are in communication with the oil-holding portion 40 formed on the side of the extension 31 and in the case of FIG. 5E, the lower oil grooves 21 as viewed in the drawing are not in communication with the oil-holding groove 40. In this manner, sufficient oil is supplied from the oil-holding portion 40' to such oil grooves 21 through the oil apertures 34.

In the second and fourth embodiments of the present invention, each resin mold 32 can be applied conveniently by molding an appropriate resin on and along the corresponding side edge of the strap 30.

Having now fully described the invention, it will be apparent to one of ordinary skill in the art that many changes and modifications can be made thereto without departing from the spirit or scope of the invention as set forth herein.

What is claimed is:

1. In a brake band for being pulled tight against a drum as a braked member, said brake band being composed of a lining and a strap arranged on an outer side of said lining, the improvement wherein said strap has an extension extending out from one side edge thereof in the direction of an axis of said drum beyond a corresponding side edge of said lining over substantially an entire periphery thereof to form an oil-holding portion between said extension and said drum; and said lining includes oil grooves which are open into said oil-holding portion.

2. A brake band according to claim 1, wherein said strap has been worked around at least a free side edge portion of said extension to form an additional oil-holding portion on and along a back side of said strap; and said strap defines at least one bore therethrough to permit feeding of oil from said additional oil-holding portion to a side of said lining.

3. A brake band according to claim 2, wherein said strap is bent around at least said free side edge portion of said extension in a direction away from said lining.

4. A brake band according to claim 1, wherein an additional member is attached to at least a side edge portion of said extension to form an additional oil-holding portion on and along a back side of said strap; and said strap defines at least one bore therethrough to permit feeding of oil from said additional oil-holding portion to a side of said lining.

5. A brake band according to claim 4, wherein said additional member is a resin mold.

* * * * *